US010179411B2

(12) United States Patent
Lessing et al.

(10) Patent No.: US 10,179,411 B2
(45) Date of Patent: Jan. 15, 2019

(54) SOFT ROBOTIC GRIPPERS FOR CLUTTERED GRASPING ENVIRONMENTS, HIGH ACCELERATION MOVEMENTS, FOOD MANIPULATION, AND AUTOMATED STORAGE AND RETRIEVAL SYSTEMS

(71) Applicant: Soft Robotics, Inc., Bedford, MA (US)

(72) Inventors: Joshua Aaron Lessing, Cambridge, MA (US); Ryan Knopf, Melrose, MA (US); Kevin Alcedo, Coral Springs, FL (US); Daniel Vincent Harburg, Amsterdam (NL); Sarv Parteek Singh, Somerville, MA (US)

(73) Assignee: Soft Robotics, Inc., Bedford, MA (US)

( * ) Notice: Subject to any disclaimer, the term of this patent is extended or adjusted under 35 U.S.C. 154(b) by 0 days.

(21) Appl. No.: 15/411,212

(22) Filed: Jan. 20, 2017

(65) Prior Publication Data
US 2017/0203443 A1    Jul. 20, 2017

Related U.S. Application Data

(60) Provisional application No. 62/280,802, filed on Jan. 20, 2016.

(51) Int. Cl.
*B25J 9/10* (2006.01)
*B25J 15/10* (2006.01)
(Continued)

(52) U.S. Cl.
CPC ......... *B25J 15/0023* (2013.01); *B25J 9/0027* (2013.01); *B25J 15/0004* (2013.01);
(Continued)

(58) Field of Classification Search
CPC .... B25J 15/0023; B25J 15/0004; B25J 15/10; B25J 15/12; B25J 9/0027; B25J 9/142; B25J 18/025; Y10S 901/37
(Continued)

(56) References Cited

U.S. PATENT DOCUMENTS

| 3,343,864 A * | 9/1967 | Baer ................... B25J 15/0009 |
| | | 294/119.3 |
| 3,601,442 A * | 8/1971 | Orndorff ............. B25J 15/0023 |
| | | 294/119.3 |

(Continued)

FOREIGN PATENT DOCUMENTS

| DE | 102012012289 A1 * | 12/2012 | ................ B25J 9/06 |
| WO | 2014196928 A1 | 12/2014 | |
| WO | 2015191585 A1 | 12/2015 | |

OTHER PUBLICATIONS

International Search Report and Written Opinion of PCT/US2017/014281; dated Jun. 30, 2017, 15 pages.

*Primary Examiner* — Dean J Kramer

(57) ABSTRACT

Exemplary embodiments relate to soft robotic gripper systems suited to grasping target objects in cluttered environments. Some embodiments provide extension rods, hinges, and/or rails that allow a soft robotic actuator to be extended towards or away from a robotic base and/or other actuators. Accordingly, a gripper including the actuator may be reconfigured into a size and/or shape that allows for improved access to the cluttered environment. Further embodiments relate to soft robotic gripper systems for supporting grasped objects during high acceleration movements using vacuum, gripper, and/or bellows devices. Still further embodiments relate to specialized grippers for manipulating food items.

16 Claims, 21 Drawing Sheets

(51) Int. Cl.
  *B25J 15/12* (2006.01)
  *B25J 15/00* (2006.01)
  *B25J 15/06* (2006.01)
  *B25J 9/00* (2006.01)
  *B25J 9/14* (2006.01)

(52) U.S. Cl.
  CPC ....... *B25J 15/0014* (2013.01); *B25J 15/0616* (2013.01); *B25J 15/10* (2013.01); *B25J 15/12* (2013.01); *B25J 9/142* (2013.01); *Y10S 901/37* (2013.01); *Y10S 901/40* (2013.01)

(58) Field of Classification Search
  USPC ...................................... 294/99.1, 210, 119.3
  See application file for complete search history.

(56) References Cited

U.S. PATENT DOCUMENTS

| | | | | |
|---|---|---|---|---|
| 3,640,564 A * | 2/1972 | Kuster | ................... | B25B 11/00 294/112 |
| 4,273,505 A * | 6/1981 | Clark | ................... | B25J 15/0023 279/2.08 |
| 4,403,801 A * | 9/1983 | Huff | ................... | B25J 15/0023 294/119.3 |
| 4,547,121 A * | 10/1985 | Nesmith | ................ | B25J 18/025 212/230 |
| 4,770,456 A * | 9/1988 | Phillips | ................... | B25J 15/00 279/2.17 |
| 5,062,761 A * | 11/1991 | Glachet | .................. | B25J 18/025 414/4 |
| 5,090,758 A * | 2/1992 | Lord | .................... | B25J 15/0023 294/119.3 |
| 5,125,789 A * | 6/1992 | Farr | ........................ | B25J 9/023 414/728 |
| 5,245,885 A * | 9/1993 | Robertson | ............ | B25J 15/0009 294/119.3 |
| 5,385,080 A * | 1/1995 | Suzumori | ................ | B25J 15/12 91/525 |
| 5,403,056 A * | 4/1995 | Wallace | ............... | B25J 15/0023 294/98.1 |
| 6,846,029 B1 * | 1/2005 | Ragner | ..................... | B25B 9/00 294/219 |
| 7,475,927 B2 * | 1/2009 | Maffeis | .................... | B25J 15/12 279/2.17 |
| 8,727,410 B2 * | 5/2014 | Jones | ....................... | B25J 5/005 294/183 |
| 8,979,151 B2 * | 3/2015 | Mukou | ............... | B25J 15/0206 294/106 |
| 2006/0033350 A1 * | 2/2006 | Besch | ................... | B25B 5/065 294/119.3 |

* cited by examiner

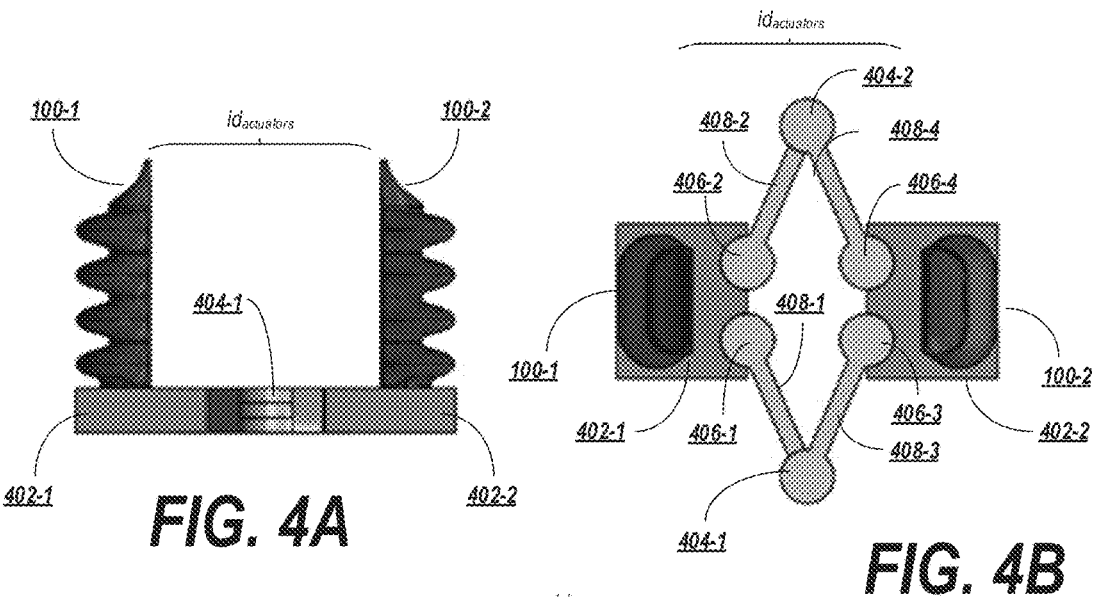
FIG. 4A
FIG. 4B
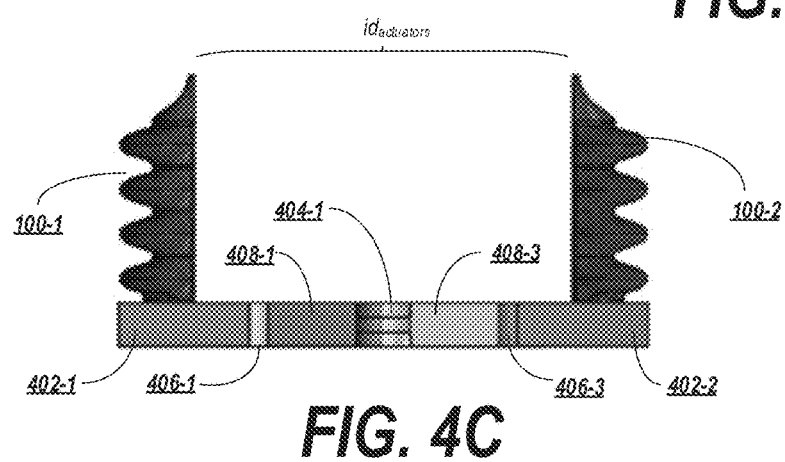
FIG. 4C
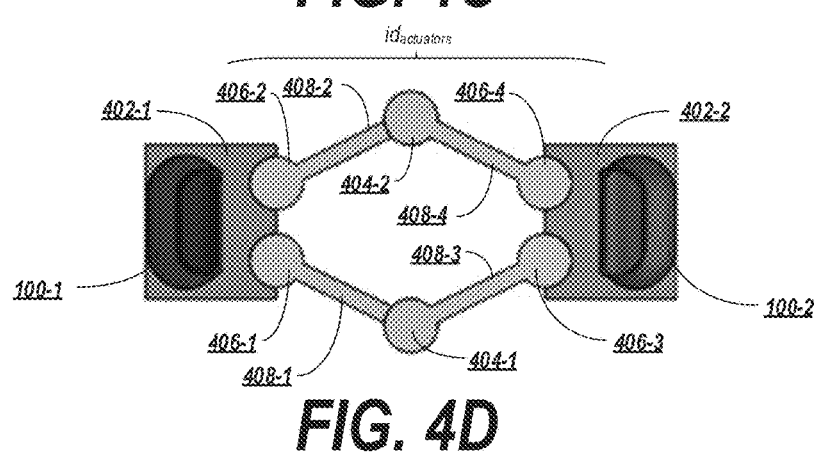
FIG. 4D

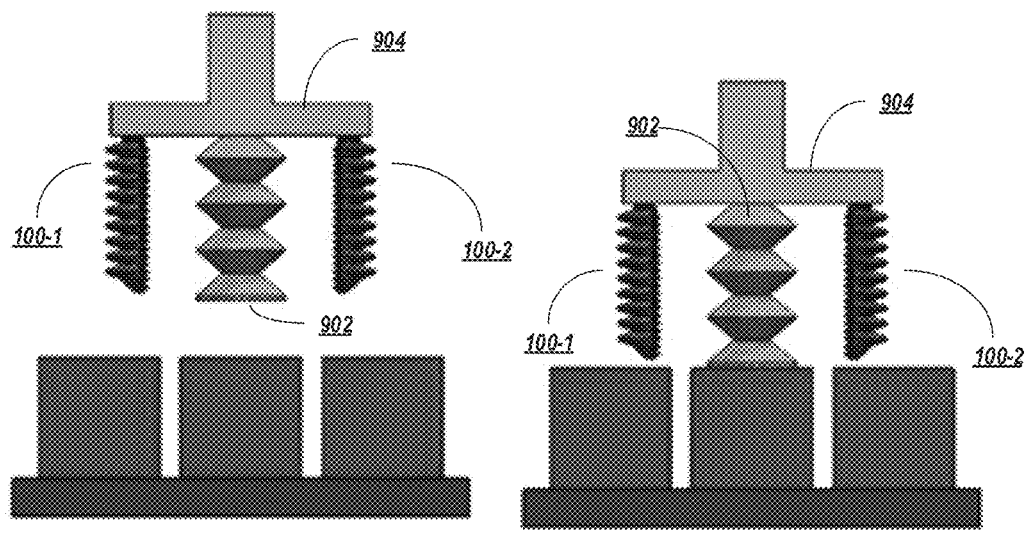
FIG. 9A  FIG. 9B
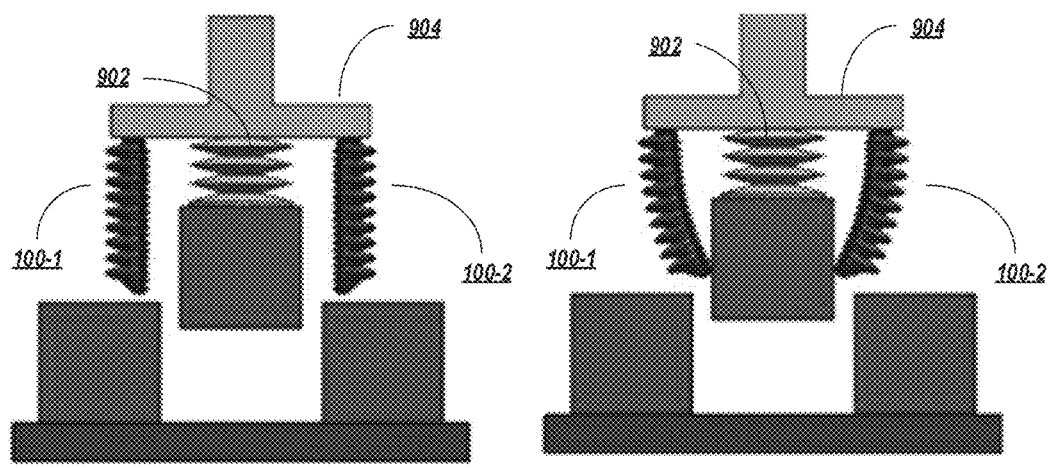
FIG. 9C  FIG. 9D

SOFT ROBOTIC GRIPPERS FOR CLUTTERED GRASPING ENVIRONMENTS, HIGH ACCELERATION MOVEMENTS, FOOD MANIPULATION, AND AUTOMATED STORAGE AND RETRIEVAL SYSTEMS

RELATED APPLICATIONS

This application claims priority to U.S. Provisional Patent Application Ser. No. 62/280,802 filed on Jan. 20, 2016 and entitled "Soft Robotic Grippers for Cluttered Grasping Environments, High Acceleration Movements, Food Manipulation, and Automated Storage and Retrieval Systems." The contents of the aforementioned application are incorporated herein by reference.

BACKGROUND

Robotic graspers are increasingly used to automate the retrieval of items from a warehouse. Typically, a warehouse includes many shelves, each containing a number of bins or totes storing items (e.g., items offered for sale). When an order for items is received, the appropriate items are retrieved from the bins or totes and packaged together for shipment.

Due to the size and shape of the totes or bins, the size, weight, and shape of items in the totes or bins, the variability in size, weight, and shape of items in the totes or bins and due to the relatively tight storage constraints in a warehouse or an individual tote or bin, retrieving an item from one of the totes or bins may be difficult for conventional robotic systems. Often, robotic arms include bulky components, or systems extending laterally from the body of the robotic arm, which make it difficult to navigate confined spaces.

Another situation in which conventional robotic systems may suffer from deficiencies includes the manipulation of relatively delicate food items, particularly baked goods such as dough, pastries or bread. Such food items may include certain elements, such as frosting, drizzle, or a coating, which may be damaged if handled roughly. Some food items may also be relatively slippery or sticky, making accurate placement by a robotic manipulator difficult. Baked goods may also be placed into plastic bags having a relatively low-friction surface, which may make manipulation of the final packaged product difficult.

The present application is addressed to these and other issues of robotic systems. Although exemplary embodiments are described in connection with bin-picking and the manipulation of food items, one of ordinary skill in the art will recognize that the present invention is not so limited, and may be used in a variety of applications.

BRIEF DESCRIPTION OF THE DRAWINGS

FIGS. 4A-4D depict an exemplary adjustable hinged gripper having actuator hubs connected by a set of hinges and extension rods.

FIGS. 9A-9D depict an exemplary gripper employing a suction device for securing a target object.

DETAILED DESCRIPTION

Figure 1A:
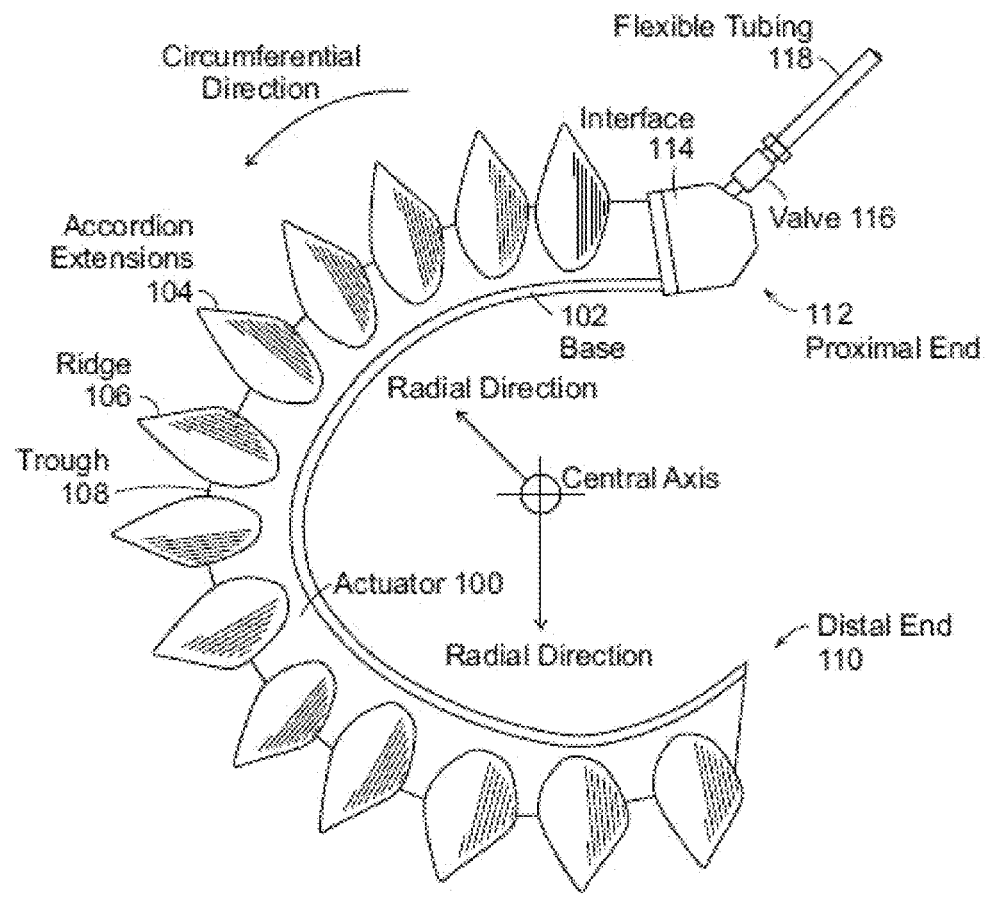
FIGS. 1A-1D depict exemplary soft robotic actuators suitable for use with exemplary embodiments described herein.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Background on Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
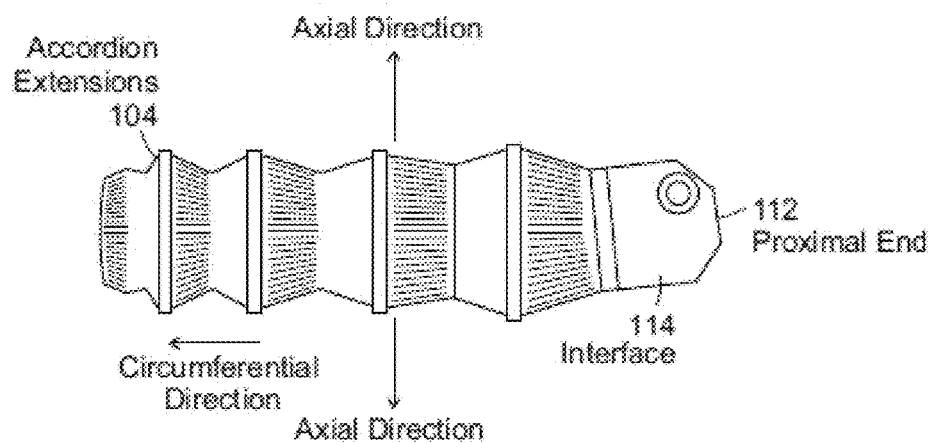
Figure 1C:
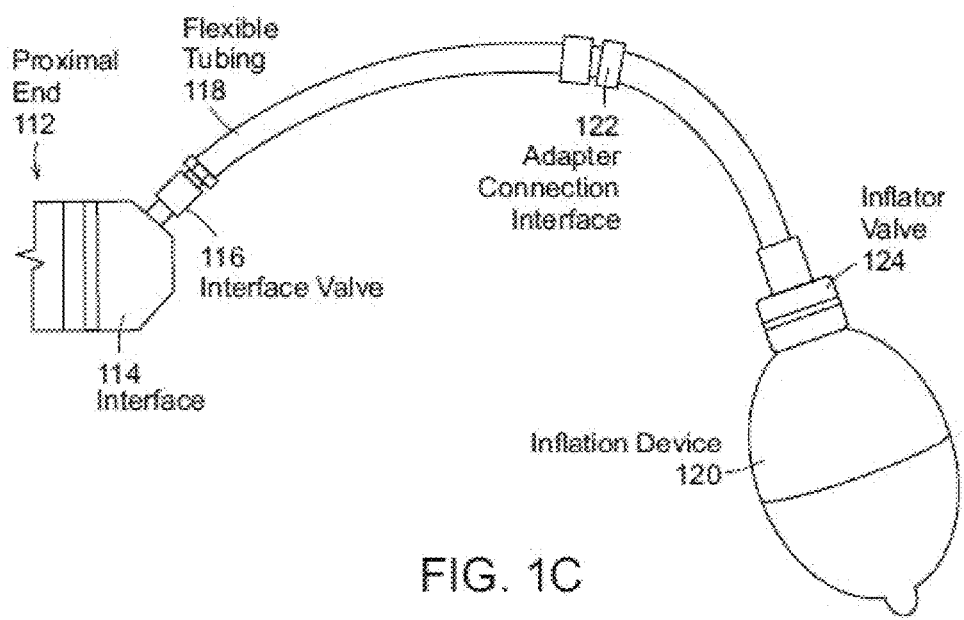
Figure 1D:
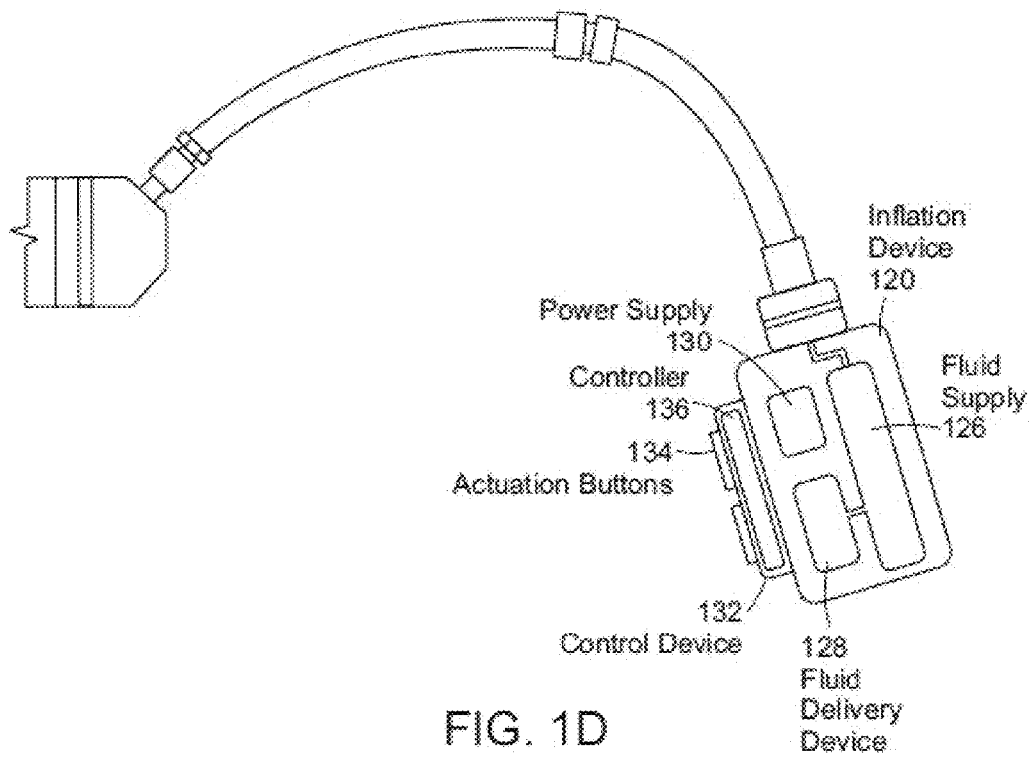

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the retractor to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of the incision retractor. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100. The controller 136 may be programmed with suitable logic or instructions encoded on a non-transitory computer-readable medium for performing the procedures described herein.

Grippers Mounted on Extension Rods

Soft robotic grippers are adept at gripping objects in cluttered and unstructured environments such as grabbing an individual part off of a pile of parts in a storage bin. Many robotic arms on the other hand are large and bulky and as a result will collide with the bin as the end-effector approaches the part. This problem can be mitigated by attaching the soft robotic gripper to the arm via an extension rod. This rod is narrow in profile and as a result is less likely to collide with a bin while the gripper approaches an object in that bin.

Figure 2A:
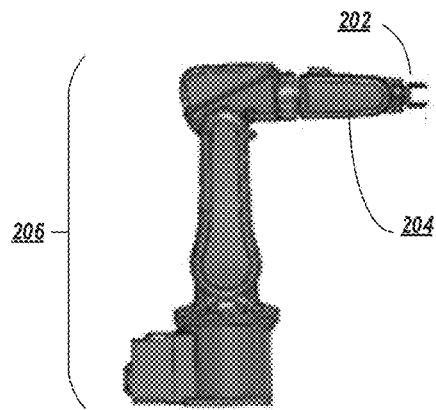
FIGS. 2A-2C depict an example of a robotic system including an extension rod for positioning a soft robotic gripper with respect to a robotic base.
Figure 2B:
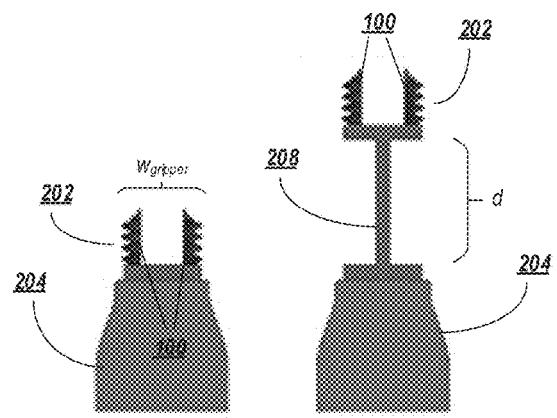
Figure 2C:
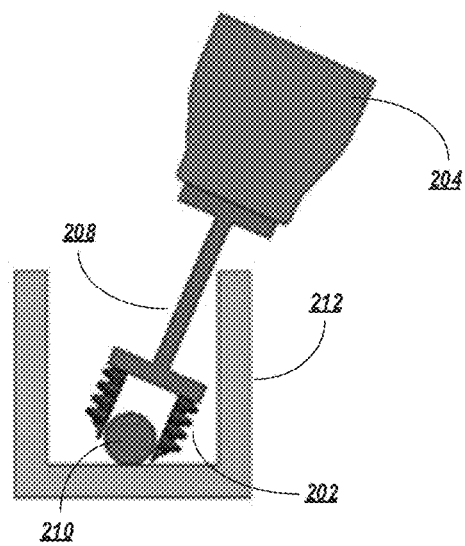

FIGS. 2A-2C depict an example of a soft robotic system employing an extension rod 208 for allowing a soft robotic gripper 202 to reach into tight spaces, such as a tote or bin in a warehouse. It is noted that all soft actuators in FIGS. 2A-2C are depicted in their unactuated state.

FIG. 2A depicts a robotic arm 206 with soft robotic gripper 202 attached. The gripper 202 may include one or more soft robotic actuators 100 (see FIG. 2B). In the embodiment depicted, two such actuators are attached to the robotic arm 206 through a distal end 204 of the robotic arm having mounting hardware suitable for connecting the gripper 202 to the distal end 204. The robotic arm 206 may have one or more joints which can be manipulated to locate the gripper in a particular location and/or orientation in three-dimensional space.

The robotic arm 206 may be limited in terms of the locations into which the gripper 202 may be deployed. For example, the gripper 202 has a width $w_{gripper}$, representing the maximum distance that the gripper extends (e.g., in a direction perpendicular to the distal end 204). The distal end may also have a width warm, representing the extent of the distal end of the robotic arm in the same direction as the gripper width $w_{gripper}$. Depending on the values of $w_{arm}$ and/or $w_{gripper}$, it may be difficult or impossible to insert the gripper 202 into a container having an opening of limited size.

Therefore, according to exemplary embodiments, the robotic system may be provided with an extension rod 208 that allows a distance d from the distal end 204 of the of the robotic arm to the proximal end of the gripper 202 to be adjusted. The extension rod may have a width that is less than the width of the gripper $w_{gripper}$ and/or the width of the base $w_{base}$. Therefore, as shown in FIG. 2C, when the gripper 202 is inserted into a container 212, the smaller width of the extension rod allows the gripper 202 to be re-oriented at angles that would have been impossible without the extension rod 208.

More specifically, FIG. 2C depicts a soft robotic gripper on an extension rod positioned to grasp an object 210 in a bin or container 212. The extension rod 208 allows the soft gripper 202 to reach into tight spaces without the bulky robotic arm 206 colliding with the container 212.

In some embodiments, the extension rod 208 may be fixed in length. In other words, the extension rod may be permanently affixed to maintain the gripper 202 at the distance d from the distal end 204 of the robotic arm. Alternatively, the extension rod may be retractable/extendable. For example, the extension rod 208 may retract into the distal end 204 or may be a telescopic rod. The extension rod 208 may be manually, mechanically, pneumatically, or hydraulically adjusted.

The extension rod 208 may be constructed of any material suitable for supporting the gripper 202 from the distal end 204 of the robotic arm at the distance d defined by the extension rod 208. The extension rod 208 may slide into and out of an opening or hole in the distal end 204. Alternatively, the extension rod 208 may be mounted to a side or other external portion of the distal end 204. The robotic system may employ one or multiple extension rods 208.

In some situations, the target object 210 may best be approached at an angle (e.g., when the target object 210 is surrounded or otherwise in close proximity to other, non-target objects). In such cases, the robotic system may be programmed to initially approach the container 212 at a relatively steep angle (e.g., an angle allowing the gripper 202 to be inserted into the container 212 without colliding with the sides of the container 212 and/or objects in the container 212; such an angle may be, for example, substantially ninety degrees). Subsequently (e.g., after the gripper 202 is disposed fully or partially within the container 212), the distal end 204 of the robotic arm may be re-oriented so as to angle the gripper 202 with respect to the container 212. Before, during, or after re-orientation, the extension rod 208 may be extended so as to approach the target object 210 in a way that might not be possible if the gripper 202 were extended into the container 212 while directly attached to the distal end 204. For example, it can be seen that, if the extension rod 208 were not present in the embodiment of FIG. 2C, the gripper would not be able to directly approach the target object 210 due to the width of the gripper 202 and/or the distal end of the robot arm 204; the gripper 202 and/or the distal end of the robot arm 204 would be blocked by the upper wall of the container 212. For example, even if the distal end of the robotic arm is capable of approaching the object, the width of the distal end of the robotic arm may limit the angle from which the object may be gripped without a portion of the system hitting the bin walls. In some situations, it may be desirable to grab a target object from a particular side, or at a particular angle, e.g. to avoid collision with neighboring objects or to utilize the best grasping points on the object. By re-orienting the gripper and/or extending the extension rod 208, this problem may be avoided. A controller configured to control the robotic arm 206 may be programmed with suitable logic stored on a non-transitory computer readable medium for executing such instructions).

In some embodiments, the extension rod need not necessarily extend in a direction directly outward from the base. For example, in some applications it is desirable to be able to grab objects of varying size that are located in a cluttered environment such as a bin.

One approach to grabbing objects of varying size is to design grippers capable of reconfiguring the distance between the soft actuators (either with rotary or linear motors, solenoids, conventional hard pneumatic or hydraulic actuators, or manual adjustment). In the case of picking objects out of a bin (or other cluttered environments) there is the additional requirement that the gripper be able to reduce its cross section in order to minimize the chance of a collision between the end effector and the bin.

Figure 3A:
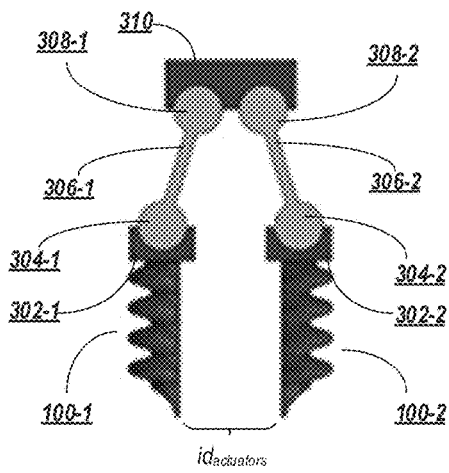
FIGS. 3A-3C depict an exemplary adjustable hinged gripper.
Figure 3B:
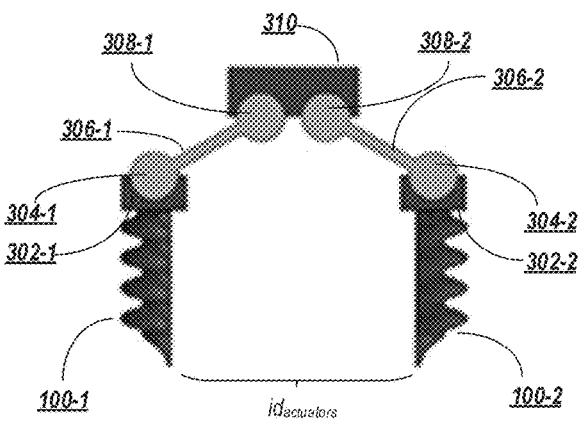
Figure 3C:
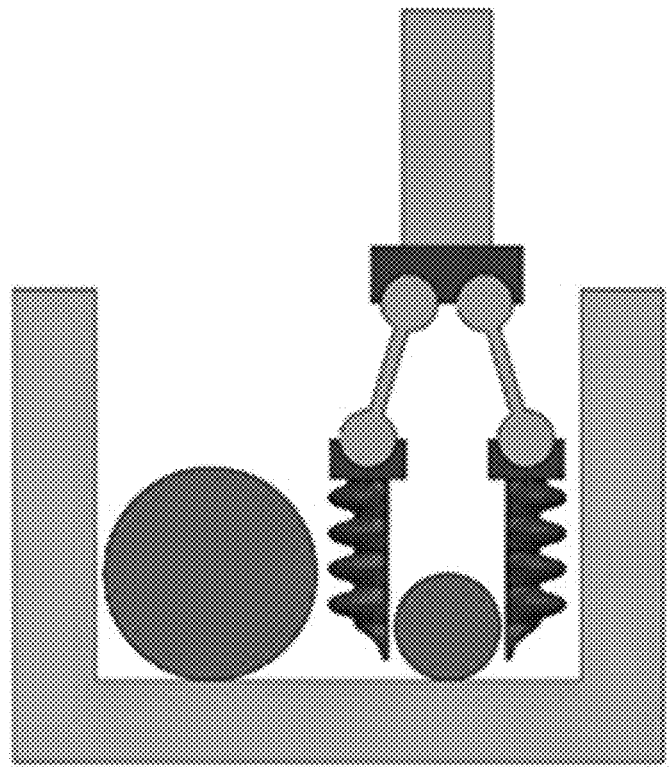

For example, FIGS. 3A-3C depict an adjustable hinged gripper. The gripper may include one or more actuators 100-1, 100-2, each affixed to an interface or actuator base 302-1, 302-2. The actuator bases 302-1, 302-2 may include or be attached to a first hinge mechanism 304-1, 304-2, respectively, that rotatably connect the bases 302-1, 302-2 to first and second extension rods 306-1, 306-2. The extension rods 306-1, 306-2 may include or may be attached to a second hinge mechanism 308-1, 308-2 that rotatably connect the extension rods 306-1, 306-2 to a gripper hub 310.

The hinge mechanisms 304-1, 304-2, 308-1, 308-2 may be manually, mechanically, pneumatically, or hydraulically adjusted to modify an interior distance between the actuators ($id_{actuators}$). For example, motors or pneumatic or hydraulic rotary actuators may be located within the hinges for the purpose of adjusting the relative distance. The same mechanisms may be used to drive the hinges 304-1, 304-2, 308-1, 308-2 to adjust the angles of the actuators 100-1, 100-2. Placing hinges both on the hub base 310 and the actuator bases 302-1, 302-2 allows the relative actuator distance to be adjusted independently from the relative actuator angle.

The size of the extension rods 306-1, 306-2 and/or the minimum and maximum amounts of rotation of the hinges 304-1, 304-2, 308-1, 308-2 may be selected so as to allow a range of values for $id_{actuators}$ based on a range of sizes of target objects to be grasped. Thus, the gripper may be moved between a contracted state (FIG. 3A) and an extended state (FIG. 3B).

Accordingly, the gripper can adjust in size in order to allow differently-sized target objects to be gripped when the actuators 100-1, 100-2 are actuated (FIG. 3C). Alternatively or in addition, the contracted gripper may be moved into a relatively narrow opening or at a certain angle for insertion into a container, and then widened in order to grasp a target object. For example, such a configuration would allow the gripper to be inserted into a plate or other obstacle with a relatively small opening, such as a hole. In this situation, the distance between the actuators may be minimized by drawing the actuators in towards each other using the hinge mechanisms. The gripper may then have a small enough width to fit through the opening. On the other side of the opening, the actuators of the gripper may be extended so as to be in a suitable position to grasp an object.

Although FIGS. 3A-3C depict a single hinged segment per actuator (e.g., the hinged segment defined by the extension rod 306-1 between the hinges 304-1, 308-1), multiple hinged segments per actuator may be employed. This may allow, for example, finer control over the actuator position, angle, distance, etc.

In a further hinged embodiment depicted in FIGS. 4A-4D, the actuator hubs may be connected together by a set of hinges. In this example, a first actuator 100-1 is affixed to a first actuator hub 402-1, and a second actuator 100-2 is affixed to a second actuator hub 402-2. Each actuator hub may be attached to one or more first hinges (in this case, hinges 406-1, 406-2, 406-3, 406-4), which may be attached to one or more second hinges 404-1, 404-2 via one or more extension rods 408-1, 408-2, 408-3, 408-4. FIGS. 4A and 4B depict such an embodiment from the side and top, respectively, while the gripper is in a contracted state. FIGS. 4C and 4D depict this embodiment from the side and top, respectively, when the gripper is in an extended state.

As in previous examples, the hinges may be controlled by any suitable means, and various parameters of the system (extension rod length, hinge minimum angle, hinge maximum angle, actuator hub size, etc.) may be set so as to provide a desired range of values for $id_{actuators}$.

Figure 5A:
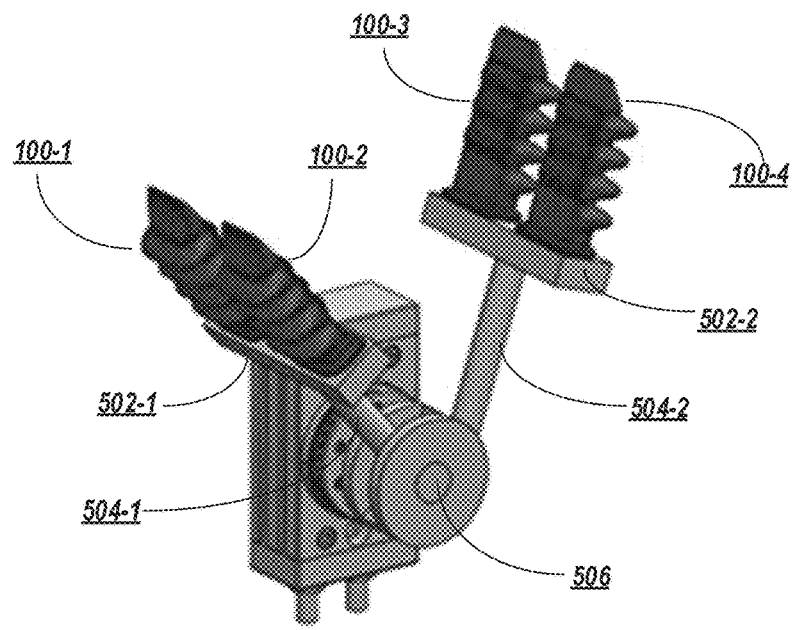
FIGS. 5A-5B depict an exemplary adjustable hinged grippers in which one of the actuator hubs is connected to a rotary actuator.
Figure 5B:
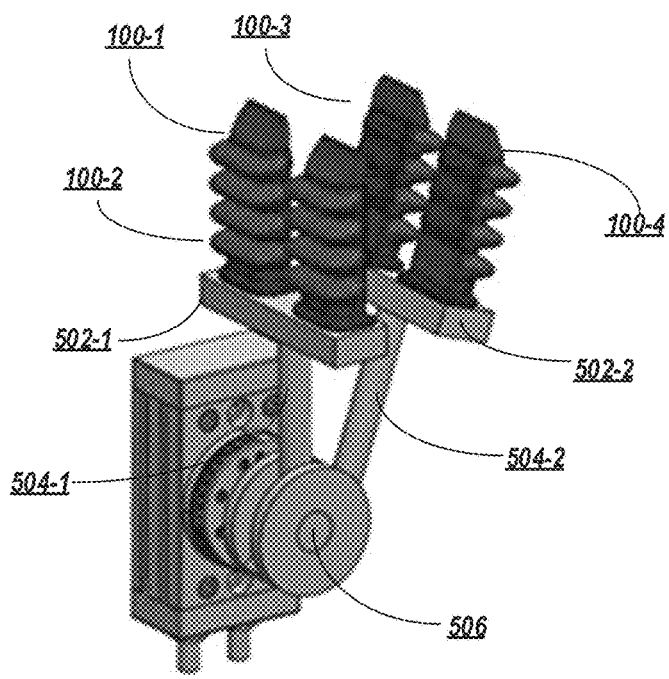

In yet another embodiment depicted in FIGS. 5A-5B the extension rods may be affixed to a rotary actuator for changing a relative angle between respective sides of the gripper system. As shown in FIG. 5A, two or more opposing actuators 100-1, 100-2, 100-3, 100-4 are respectively attached to actuator hubs 502-1, 502-2. The hubs 502-1, 502-2 are attached to extension rods 504-1, 504-2, which are themselves affixed to a rotary actuator 506.

The rotary actuator 506 may be mechanical, pneumatic, hydraulic, etc. One or both of the extension rods 504-1, 504-2 may be manipulable via the rotary actuator 506 in order to manipulate either or both of $id_{actuators}$ and the angle between respective actuators. In some embodiments, one of the extension rods 504-1 may be static or fixed, and the other extension rod 504-2 may be manipulable via the rotary actuator 506 so as to move the non-fixed actuator(s) 100-1, 100-2 into proximity with the fixed actuator(s) 100-3, 100-4, as shown in FIG. 5B.

In some embodiments, the extension rods may be in the form of rails or other similar devices capable of being driven together or apart in order to modify a distance between actuators of the gripper. FIGS. 6A-7B depict various embodiments that allow a distance between adjacent actuators to be varied while limiting the amount of space taken up by the actuator/hub system. When in a closed configuration, components of these embodiments, which may include rails or other similar hard hub components, extend to only a small degree, if at all, from the system, which allows the system to remain compact. When deployed, the actuators may be driven apart to a sufficient degree to allow the gripper to grasp relatively larger target objects.

Figure 6A:
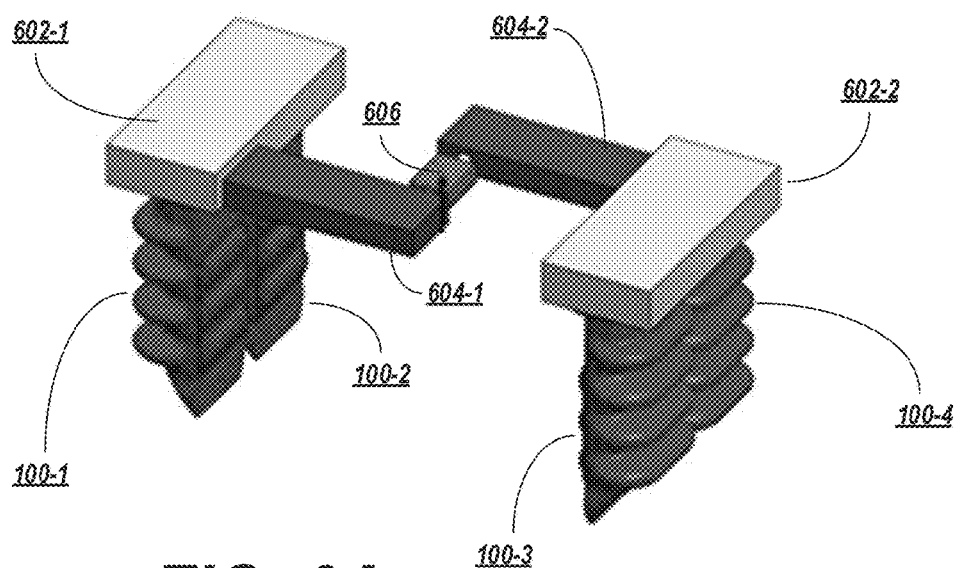
FIGS. 6A-6B depict an exemplary adjustable gripper employing a gear-based rail mechanism.
Figure 6B:
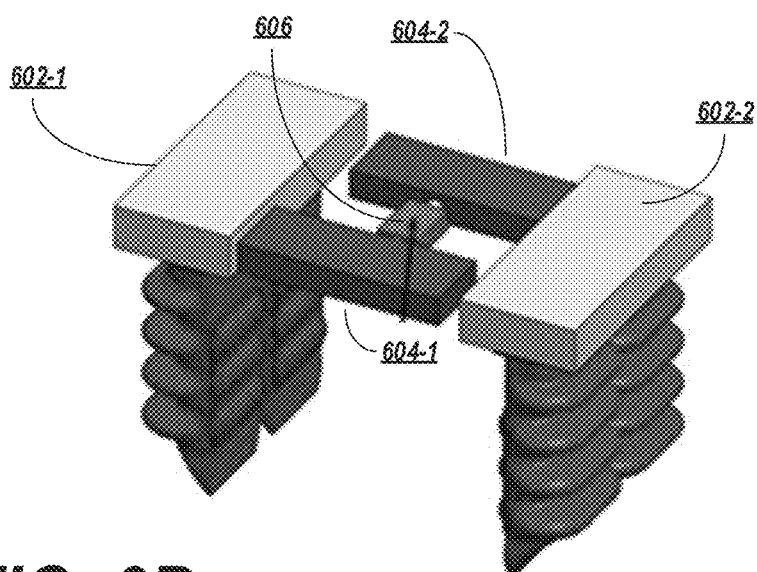

FIGS. 6A-6B depicts an embodiment in which two or more actuators (in this case, four actuators labeled 100-1, 100-2, 100-3, 100-4) are mounted to one or more gripper hubs 602-1, 602-2. The gripper hubs 602-1, 602-2 are each mounted to one or more geared rails 604-1, 604-2 and connected in a central location by a motor 606.

The rails 604-1, 604-2 may include a geared mechanism that mates with corresponding gears of the motor 606. When the motor 606 is driven in one direction, the motion of the gears may cause the geared rails to move apart, pushing the hubs 602-1, 602-2 away from each other (FIG. 6A). When the motor 606 is driven in a different direction, the motion of the gears may cause the geared rails 604-1, 604-2 to move closer together, pulling the hubs 602-1, 602-2 together (FIG. 6B).

Figure 7A:
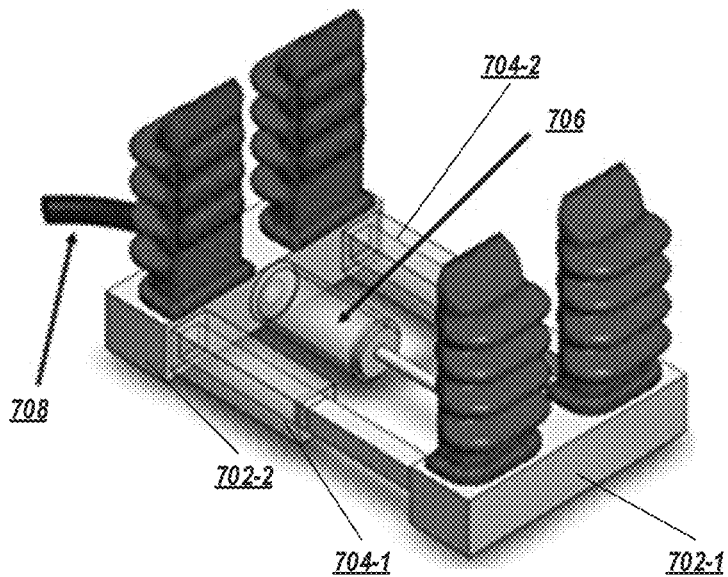
FIGS. 7A-7B depict an exemplary adjustable gripper employing a pneumatic piston mechanism.
Figure 7B:
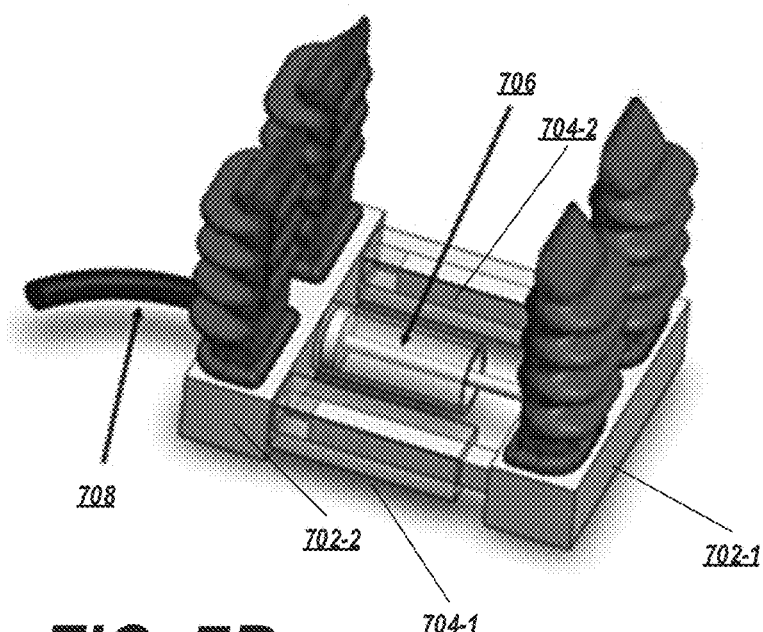

FIGS. 7A-7B depict a pneumatic system similar in operation to the motor-based system of FIGS. 6A-6B. In this system, the actuators are mounted to hubs 702-1, 702-2 which are attached to guide rails 704-1, 704-2. A pneumatic system, such as a pneumatic linear actuator 706, is operable to receive a pneumatic fluid, such as air, in order to drive apart the hubs 702-1, 702-2 as the hubs are guided along the guide rails 704-1, 704-2 (FIG. 7A), or to eject the fluid in order to drive the hubs 702-1, 702-2 together as the hubs are guided along the guide rails 704-1, 704-2 (FIG. 7B). A pneumatic fluid supply tube 708 may deliver the pneumatic fluid to or from the pneumatic linear actuator 706. It is noted that different valving systems can be used to control motion of the pneumatic system.

Alternatively or in addition to a pneumatic system, the gripper may be hydraulically adjustable via a hydraulic fluid.

Gripper with a Flexible Pad or Paddle

Next, a gripper or similar tool which use one or more soft actuators 100 to push a target object 804 against an opposing flexible and/or ridged pad or paddle 802, such as a spatula or a passively compliant pad or paddle, is described with reference to FIGS. 8A-8B.

The action of the soft actuator 100 against the object 804 allows object 804 to be held firmly to the pad or paddle 802. This configuration allows very fragile objects 804 which are unable to support their own weight when grasped on the sides, top, or bottom, to be lifted by sliding the pad or paddle 802 beneath the object 804 and then securing it with the opposing actuator 100. Furthermore, this configuration is useful when the sides or top of an object are sticky or fragile, such as in the case of an easily-cracked chocolate coating on all sides except the bottom of an object. This approach may also be employed for manipulation of low profile objects on flat surfaces (e.g. a table), narrow objects in tight spaces, or simply for cost effectiveness.

The paddle 802 and the actuator 100 may be affixed to a hub 806, which may also include an interface for supplying or withdrawing inflation fluid to the actuator. The hub 806 may be attached to a robotic arm. The hub 806 may have a selected width 11) hub that corresponds to a size or shape of the target object 804 to be grasped. For example, depending on the width of the target object, the hub width 11) hub may be selected so that the paddle 802 and the actuator 100 are appropriately spaced in order to grasp the object with a force within a predetermined target range of forces when the actuator 100 is actuated.

Figure 8A:
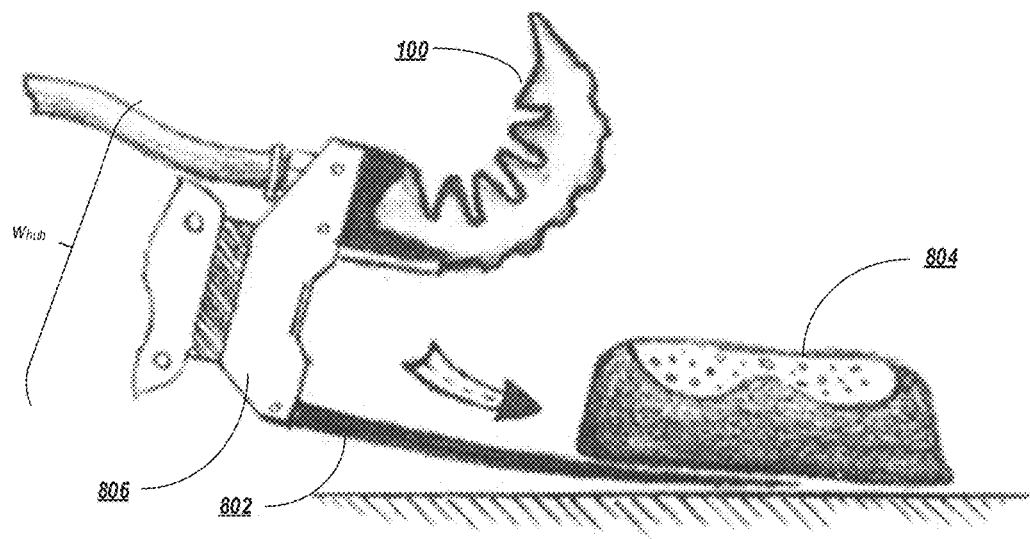
FIGS. 8A-8B depict an exemplary gripper having an actuator for securing a fragile target object against a pad or paddle.

In operation, the paddle 802 is slid beneath a fragile item (e.g. baked foods and pastries, produce, sponge like materials, loose meat products, etc.) while the opposing actuator 100 is clear and retracted (e.g., in vacuum state, see FIG. 8A). Deploying the actuator 100 in the retracted state allows the actuator 100 to be moved out of the way while the paddle 802 is slid under the target object 804.

Figure 8B:
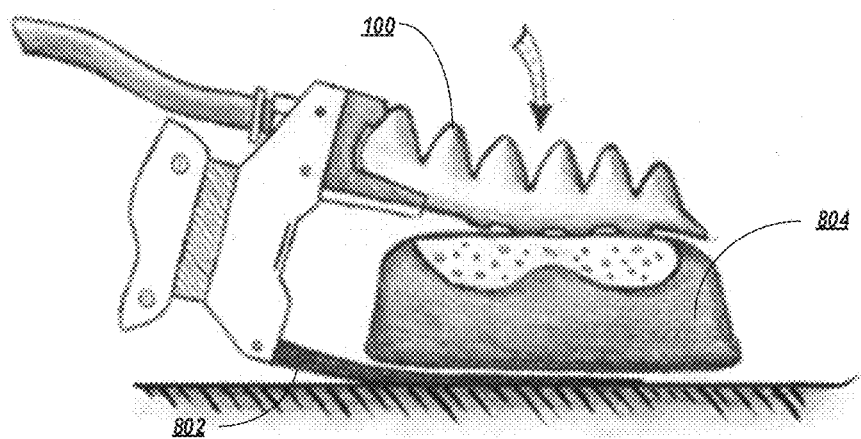

The actuator 100 may then be inflated partially or fully inflated, bringing the actuator 100 into supportive contact with the object 804 (FIG. 8B). Once the gripper has fully supported the item and the object 804 is secured against the paddle 802, the object 804 may then be moved at relatively high speeds and/or re-oriented.

It is noted that the gripper may be arranged in other configurations. For example, if a baked good is covered in frosting, it may be undesirable to grip the baked good from the top. Accordingly, the paddle may be slid under the baked good while one or more actuators grasp the baked good from the sides. In another example, a paddle may be slid under a hamburger or other sandwich to support its weight, and one or more actuators may be applied from the side to prevent the sandwich from sliding off the paddle during acceleration or deceleration.

Moreover, as an alternative or in addition to a flexible pad or paddle, the gripper may direct objects into a box, pan, or other form of receptacle. For example, a robotic tool may include a dustpan-like enclosure with one or more soft robotic actuators that sweep objects into the enclosure.

Suction- and/or Bellows-Assisted Grippers

FIGS. 9A-9D depict an example of a gripper employing a suction cup 902.

There are many scenarios where a suction cup gripper may be adept at removing objects from closely packed environments. A suction cup 902 may serve to provide improved grasping capability, better securing a target object held by one or more actuators 100.

In some instances the grip that the suction cup 902 obtains may not be strong enough to retain the object as the gripper is reoriented or rapidly accelerated or decelerated by a robot. In these instances, it may be useful to use a suction cup to initially remove the object from a closely packed environment, and then further grip as well as cradle the object with soft actuators 100 which will secure the object as the gripper is reoriented or rapidly accelerated or decelerated.

The suction cup 902 and the actuators 100-1, 100-2 may be mounted to a gripper hub 904. In some embodiments, a distal end of the suction cup 902 may extend beyond the distal end(s) of the actuators 100-1, 100-2. Accordingly, when the gripper is lowered over a target object to be grasped (FIG. 9B), the suction cup 902 makes initial contact with the target object.

Optionally, the gripper hub 904 may be capable of applying a vacuum to the suction cup 902 in order to engage the suction cup 902 (causing the suction cup 902 to withdraw towards the gripper hub 904, as shown in FIG. 9C). More specifically, as long as an opening at the end of the suction cup 902 is blocked (e.g., by the grasp target), the suction applied to the cup 902 has the effect of collapsing one or more accordion folds of the cup 902.

Once the target object is pulled clear of other objects in the environment, the actuators 100-1, 100-2 may be actuated in order to grasp and further secure the target object (FIG. 9D).

In some embodiments, the suction cup 902 may be attached to a retractable rod. In these cases, the suction cup 902 may be extended towards a grasp target by action of the rod. The suction cup 902 may seal with the grasp target, at which point the rod may be retracted back towards the gripper hub 904 thus drawing the grasp target back towards the actuators 100-1, 100-2 attached to the gripper hub 904. The actuators 100-1, 100-2 may then be actuated in order to hold and cradle the grasp target.

In some embodiments, the suction cup 902 does not substantially change length upon applying vacuum. In these cases, the actuators 100-1, 100-2 may be reverse curled so that they do not interfere with the suction cup's ability to contact the object and gain an initial grasp. After the object has been grasped and pulled away from its cluttered environment by the suction cup 902, the vacuum in the soft actuators 100-1, 100-2 may be replaced by positive pressure in order to allow the soft actuators 100-1, 100-2 to apply a gripping force to the grasp target.

Figure 10A:
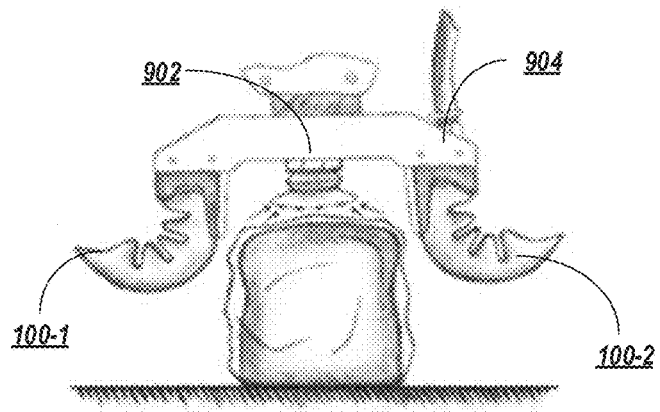
FIGS. 10A-10C depict an exemplary suction-augmented gripper securing loose materials surrounding a target object to improve sureness of grasp with the soft actuators of the gripper.
Figure 10B:
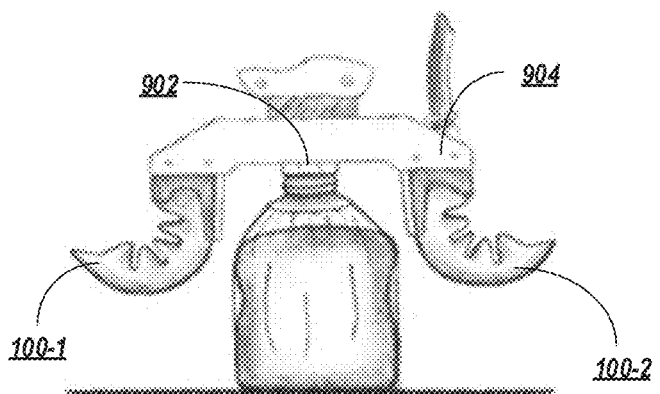
Figure 10C:
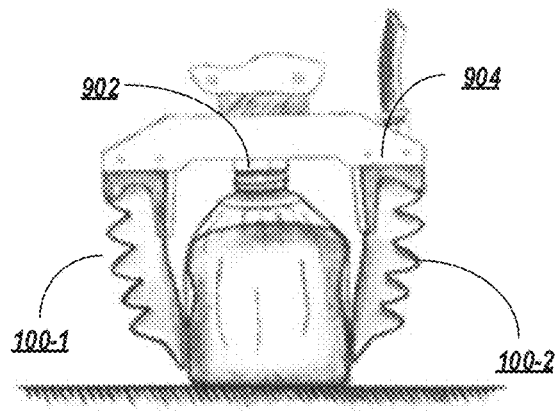

An example of this configuration is depicted in FIGS. 10A-10C. In addition to illustrating the reverse curl of the actuators 100-1, 100-2, this configuration also shows the suction cup 902 or cups used to prepare an object for manipulation. For example, the suction cup 902 may be used to partially support the object's weight, positioning it in a manner that aides in grasping the item with soft actuators 100-1, 100-2, or (in the depicted example) securing loose materials surrounding the item to improve sureness of grasp with the soft actuators 100-1, 1002- by reducing the possibility that contents may shift or slip in the grasp during motion (e.g. bagging, wrapping, cloth, or mesh are pulled taught via suction before the item is grasped by the surrounding soft actuators).

For instance, FIG. 10A depicts a gripper in which the suction cup 902 is activated whilst the surrounding soft actuators 100-1, 100-2 are retracted as the grasp target object is approached. FIG. 10B depicts the gripper in a state where the suction cup has pulled the bagging or wrapping material taught. Optionally, the suction cup may further or in the alternative partially supported the weight of the grasp target object. FIG. 10C depicts the gripper in a state where the surrounding soft actuators 100-1, 100-2 are activated and secure the grasp target object. High speed manipulation of the loose bagged or wrapped item may now be performed with reduced risk of slipping against the bagging or wrapping material or shifting of the item enclosed.

Other systems may be used in place of, or in addition to, suction cups. For example, FIGS. 11A-11C depict a soft gripper with a compliant element (a bellows 1102 attached to a compliant pad 1104 and a gripper hub 1106, in this example).

A bellows system 1102 may be useful in allowing the grasped object to be positioned precisely by the gripper upon release. One example in which such control may be useful involves putting cookie dough balls down on a cooking sheet. In this example, the cookie dough may be relatively sticky and as a result the ball tends to stick to one of the fingers of the gripper more than the others when the fingers release the dough ball. In these cases, the dough ball tends to be pulled in the direction of the finger it is stuck to the most, and therefore lands on the cooking sheet off-center from the desired placement position. This creates a problem during cooking, because if a cookie dough ball is close to its neighbor during the baking process it will merge with its neighbor forming one large misshapen cookie.

In some applications, placement accuracy may be improved by using a locating feature in the environment that locates the object after it has been released from the grasp. However, this is not possible for cookies since they need to be cooked on a flat sheet (otherwise the structure of the environment will be embedded into the shape of the final cooked product). Alternatively, one could compensate for inaccuracy in placement by adding more spacing between dough balls on a baking sheet. However, this may be an unacceptable solution due to decreased efficiencies, including lower throughput for the bakery due to the lower number of dough balls per cooking sheet area. Thus, fine placement control may be especially important in this application.

Figure 11A:
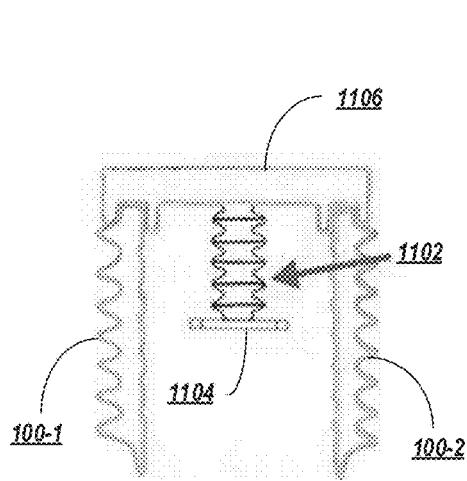
FIGS. 11A-11C depict an exemplary gripper employing a compliant element (in this case, a bellows) for securing a target object and/or increasing placement accuracy.
Figure 11B:
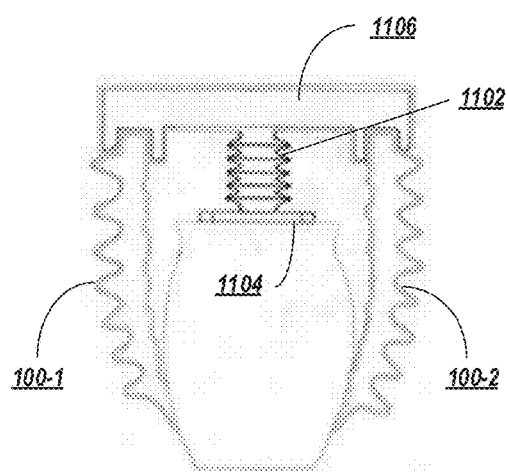
Figure 11C:
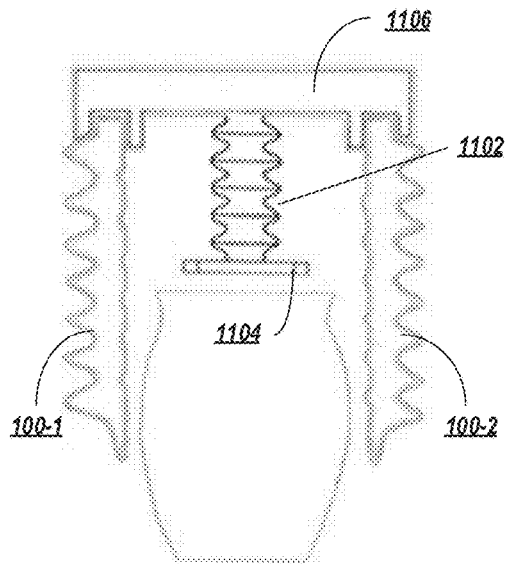

FIG. 11A depicts a bellows 1102 with a compliant pad 1104. The pad 1104 material may be chosen based on the objects being interacted with, or in some embodiments the pad 1104 may be eliminated entirely in favor of an accordion bellows 1102. In the depicted embodiment, the bellows 1102 is initially provided at a neutral position and a neutral length.

In FIG. 11B, the gripper has grasped an object. Initially, the hub 1106 is moved downwards, causing the bellows 1102 to become compressed by virtue of the force exerted between the grasped object (transmitted by the pad 1104) and the gripper hub 1106. The actuators 100-1, 100-2 may then be actuated in order to firmly grasp the object.

In FIG. 11C, the gripper releases the object by de-actuating the actuators 100-1, 100-2. The bellows 1102 thrusts back towards and past the neutral position by virtue of the stored force, thus helping to position the object accurately.

For grasp and positioning, a number of methods may be used. For example, a bellows 1102 may be used without supplying supplemental force (e.g., without applying a vacuum or positive pressure to the bellows 1102). In such an embodiment, a target object may be placed in a target location by virtue of the compliant structure's restoring force. In another embodiment, the bellows 1102 may be employed with a vacuum for holding the object in place. In this case, the vacuum may assist with providing a better grasp of the object. In yet another embodiment, the bellows may be used with a positive pressure (e.g., for releasing the object). In this case, additional force may be generated upon release of the object, allowing the object to be placed more accurately. Still further, a compliant pad 1104 may be attached to a rod that is driven by a driving mechanism (e.g., a motor, a pneumatic system, a hydraulic system, etc.). When the grasp target is about to be released, the actuators may be retracted (e.g., by application of a vacuum or negative pressure) and the rod may be extended to push the target object away from the gripper. The rod may be extended at the same time as the actuators are retracted, or shortly beforehand. In this case, the timing of the driving rod's extension motion relative to the timing of the actuators' opening motion may be tuned to provide a desired delay for a given application. A hardware controller may be programmed with suitable logic for controlling the opening of the actuators and the driving of the rod at appropriate timings to release the target object.

These techniques may be employed together (e.g., using a vacuum to improve grip and supplementing the release force with added positive pressure).

Figure 12:
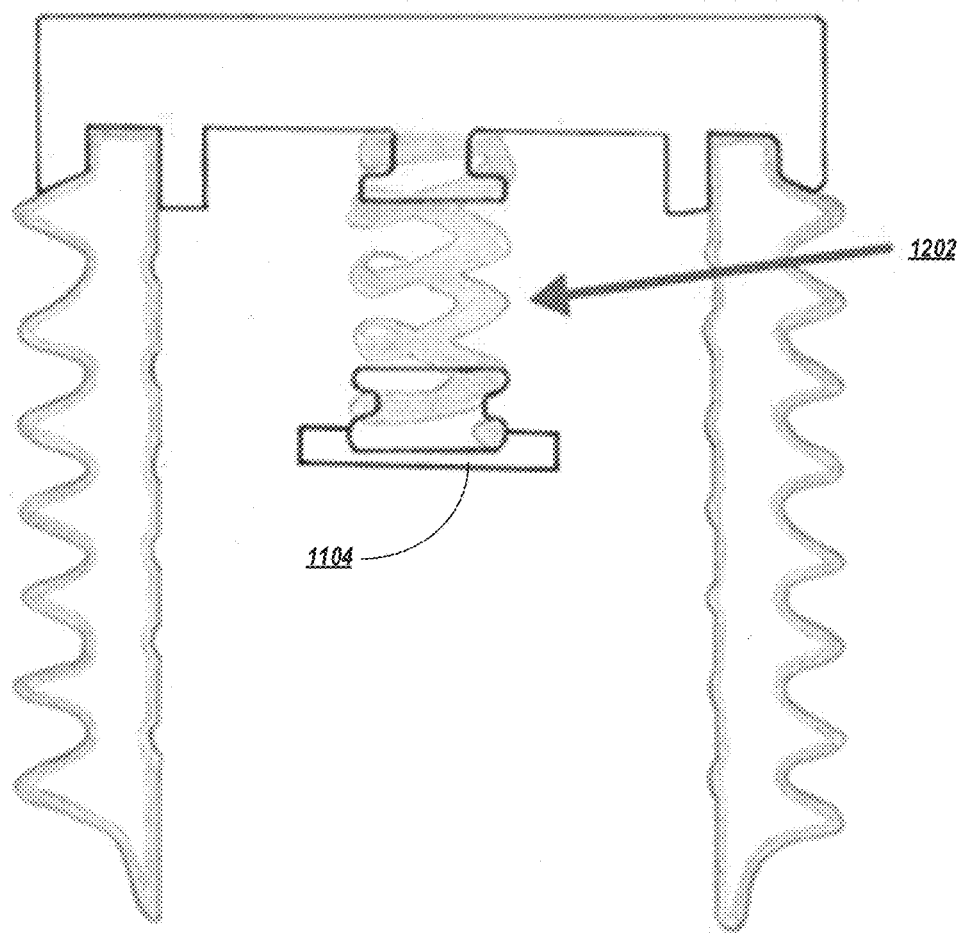
FIG. 12 depicts an exemplary gripper employing a compliant element (in this case, a spring) for securing a target object and/or increasing placement accuracy.

Object positioning on release can also be achieved via other compliant elements such as springs 1202, as shown in FIG. 12. The theory of operation for such elements is similar to that depicted in FIGS. 11A-11C.

The concept of using compliant structures, as depicted in FIGS. 11A-12, can be achieved by using multiple compliant structures in series or parallel, or in any suitable combination to achieve the desired compliance/stiffness value.

Figure 13A:
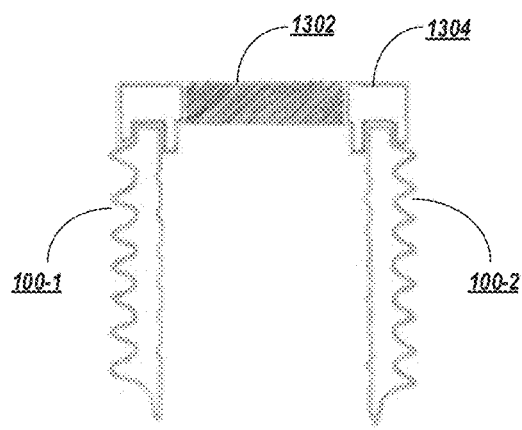
FIGS. 13A-13C depict an exemplary gripper employing a deformable elastic membrane for securing a target object and/or increasing placement accuracy.
Figure 13B:
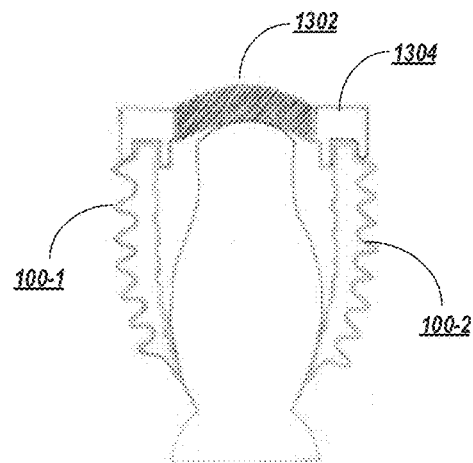
Figure 13C:
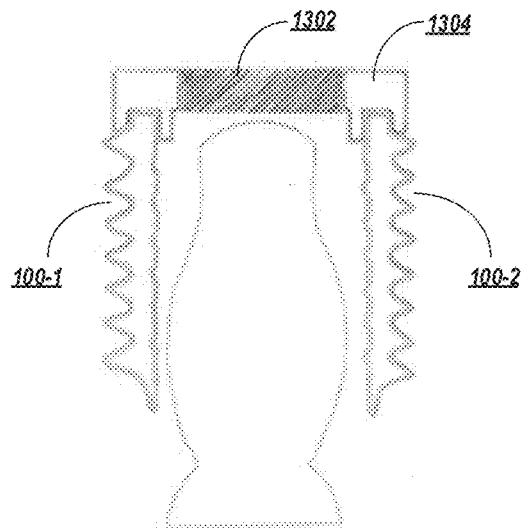

In some cases, soft grippers may need to grasp objects of sizes larger than the length of the actuators. For such applications, a deformable membrane 1302 may be employed, as shown in FIGS. 13A-13C. The deformable membrane 1302 may be a part of the gripper hub 1304, or may be a separate part located between at least a portion of the actuators 100-1, 100-2 and the actuator hub 1304. If the membrane 1302 is elastic, it not only deforms to accommodate the large object during the grasp, but also helps in positioning it during release by virtue of the restoring force it exerts back on to the object (during release).

Moreover, in the case of compliant grasp targets like dough balls, the membrane 1302 may also be used to shape the object being grasped due to the force being applied to the grasp target by the deformed membrane 1302.

FIG. 13A depicts a gripper having a membrane 1302 at an initial length. In this neutral position, the membrane 1302 may be under some tension to stay horizontal and not sag under its own weight (the membrane 1302 may or may not be pre-tensioned depending upon the requirement of the application).

FIG. 13B depicts the gripper holding an object, with the actuators 100-1, 100-2 in an actuated state. The membrane 1302 stretches (by virtue of the force exerted by the object) to accommodate the shape of the grasped object.

In FIG. 13C, the gripper releases the object. The membrane 1302 regains its initial shape. Because the membrane 1302 is elastic, it returns the force it stored by pushing away the grasped object, thus helping in positioning the object.

Figure 14A:
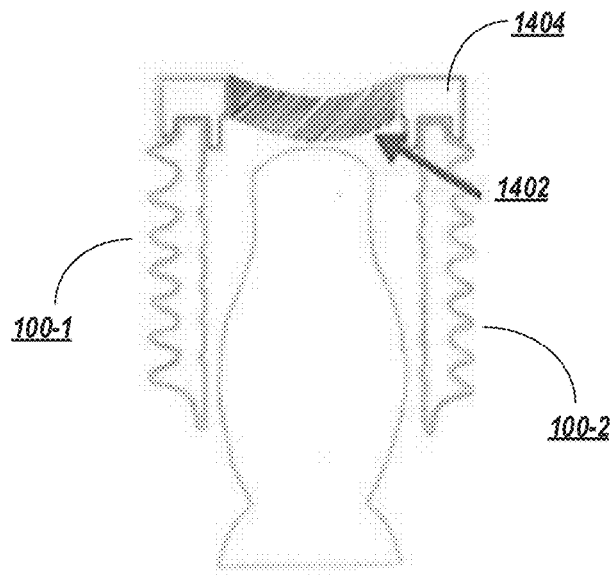
FIGS. 14A-14B depict an exemplary gripper employing a rigid membrane.
Figure 14B:
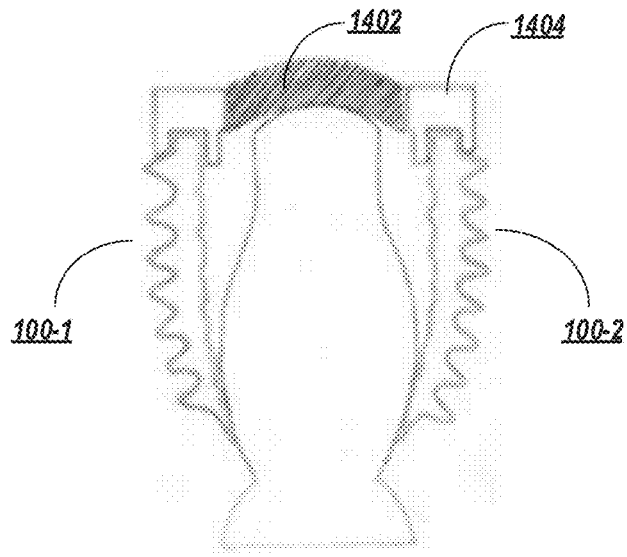

The grasp of large objects can also be achieved by using a non-elastic membrane, as shown in FIGS. 14A-14B. In this embodiment, the membrane 1402 may be made of a material such as fabric or textile. The theory of operation is similar to that of the elastic membrane, except that the membrane 1402, being non-elastic, cannot stretch to accommodate the object. Instead, the membrane 1402 may flip to the other side of the hub 1404 to provide space for the object. Further, such a membrane 1402 may provide no or minimal force to help in positioning the object during release.

Nonetheless, the membrane may still aid in gripping since it can envelope the object and generate friction. It can also apply a force on the object, if the object is pressed hard into the fabric.

For example, FIG. 14A depicts a gripper with the membrane 1402 in its natural position (in this embodiment, the membrane 1402 sags under its own weight). The actuators 100-1, 100-2 are unactuated. FIG. 14B depicts the gripper holding an object. The actuators 100-1, 100-2 are actuated, while the membrane 1402 folds over to the opposite side of the hub 1404 to accommodate the shape of the grasped object.

Figure 15A:
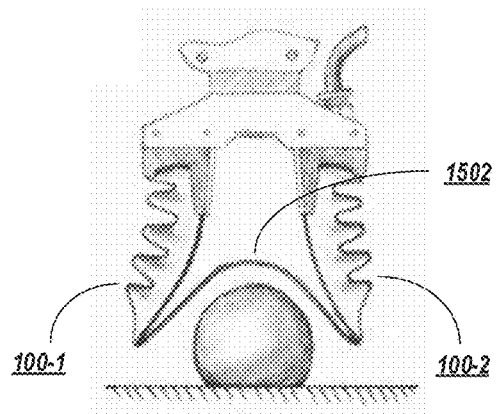
FIGS. 15A-15J depict an exemplary gripper with a membrane attached to the tips of the gripper's actuators to secure a target object and/or increase placement accuracy.
Figure 15B:
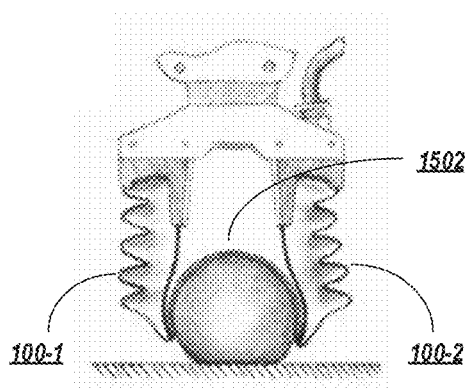
Figure 15C:
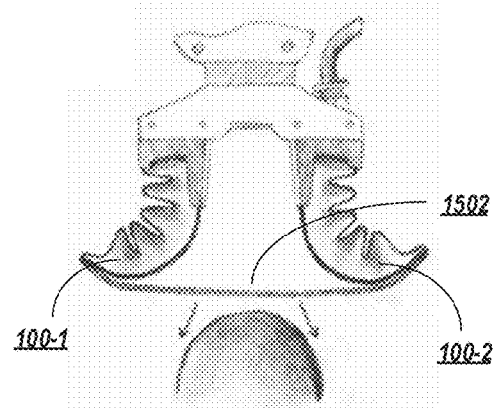

FIGS. 15A-15C depicts a gripper incorporating a flexible or extensible membrane as in the previous examples. However, in these embodiments, the membrane 1502 connects the contact surfaces of two or more soft actuators 100-1, 100-2. The membrane 1502 may be configured to assist target object release, provide a removable/replaceable contact surface against the target object, and/or to more completely envelope the target object. Such functionality may be useful, for example, to grasp loosely packed items or clusters of smaller items if the membrane 1502 is appropriately sized to (e.g.) completely envelop a certain volume. The membrane 1502 may also be used to shape a compliant grasp target, such as a dough ball. Furthermore, the membrane 1502 may be designed such that upon release of the surrounding actuators it is pulled taught, effectively ejecting the contained object in a repeatable and controlled way. Still further, the membrane 1502 is useful for gripping highly slippery and deformable objects, such as raw chicken drumsticks.

The membrane 1502 may be detachable to provide a contact surface that can be easily cleaned or replaced to prevent marking of objects and to maintain a sanitary contact surface for food items.

FIG. 15A depicts an example in which a gripper employing such a membrane 1502 is deployed in a neutral state, ready to approach a target grasp object. FIG. 15B depicts the same exemplary gripper in a state where the surrounding actuators 100-1, 100-2 which share a connection with the inner membrane 1502 are activated and cause the membrane 1502 to fully envelop the target grasp object. FIG. 15C depicts the same exemplary gripper implementation where the surrounding actuators 100-1, 100-2 have been retracted, thus causing the membrane 1502 to transition from enveloping the target grasp object to a completely taught state. This results in a downward force against the target grasp object allowing it to be controllably ejected from the grasp.

Figure 15D:
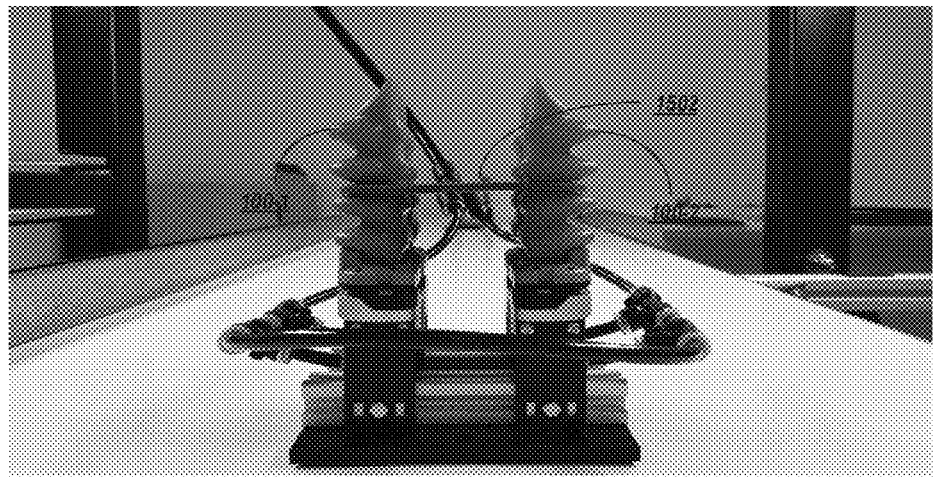
Figure 15E:
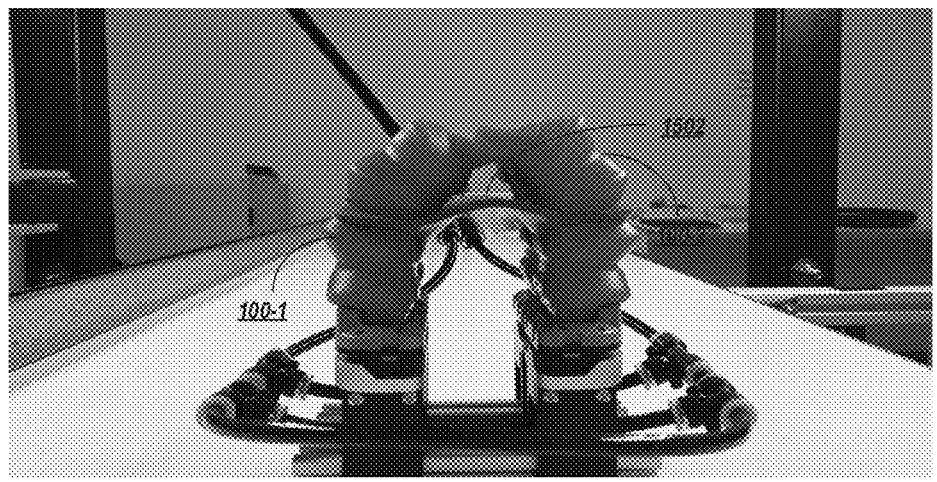
Figure 15F:
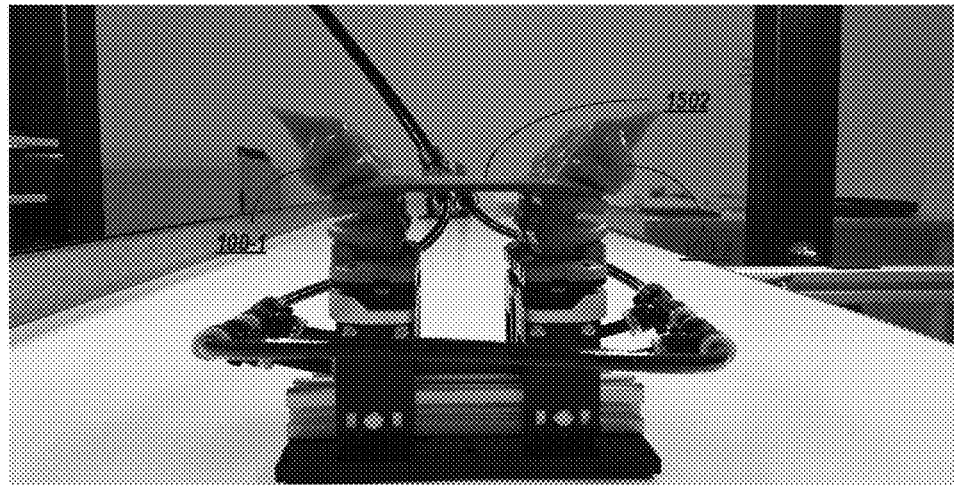

Exemplary embodiments are further depicted in FIGS. 15D-15J. For example, FIG. 15D depicts a four-actuator system (of which two, actuators 100-1 and 100-2 are visible in the side view) having a membrane 1502. The actuators in FIG. 15D are depicted in a neutral, un-actuated position. FIG. 15E depicts the same system with the actuators in a positively-inflated, actuated configuration, while FIG. 15F depicts the same system when a vacuum is applied (negative inflation).

Figure 15G:
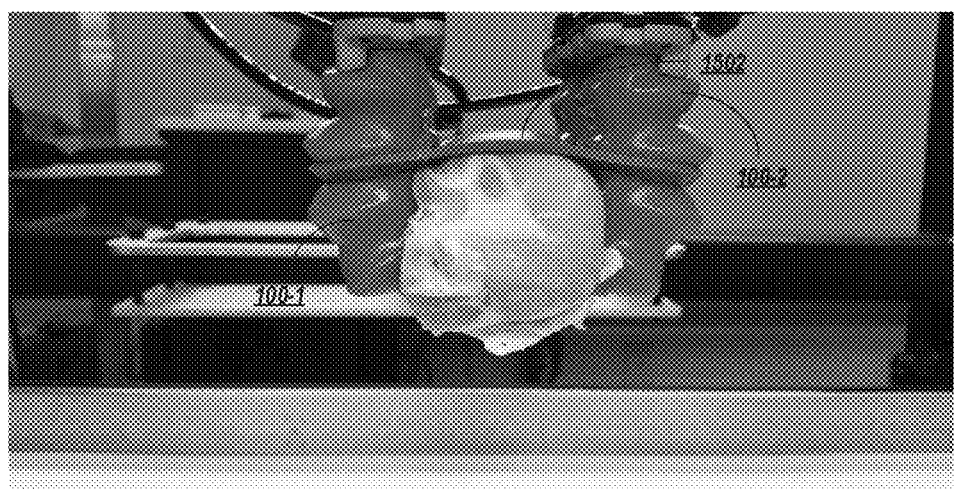
Figure 15H:
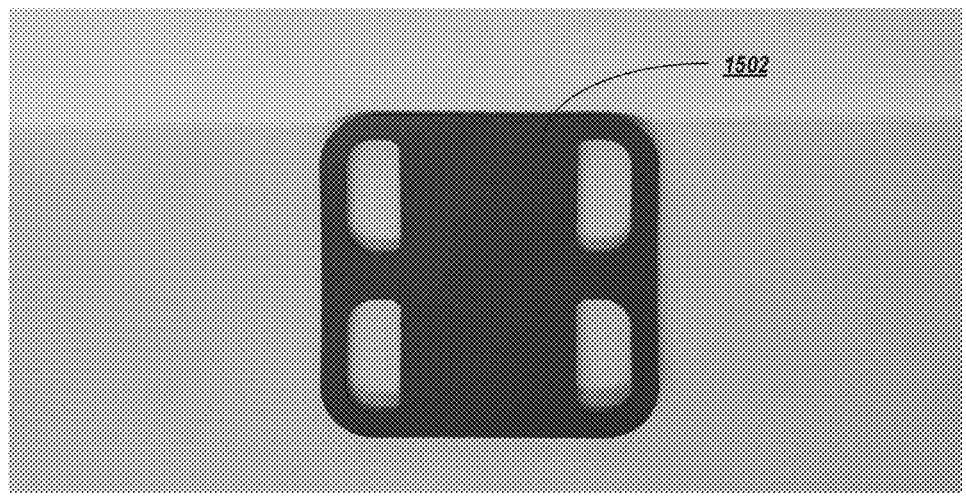
Figure 15I:
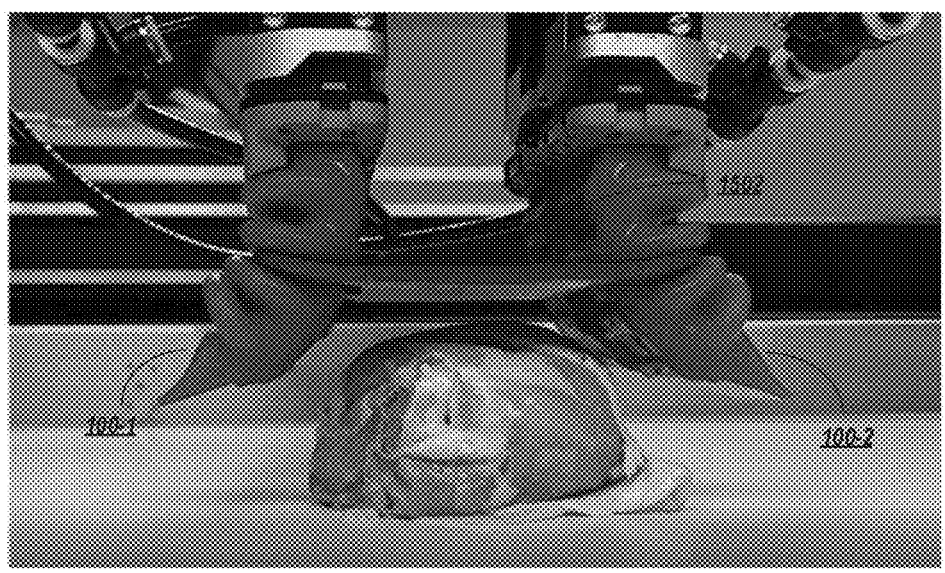
Figure 15J:
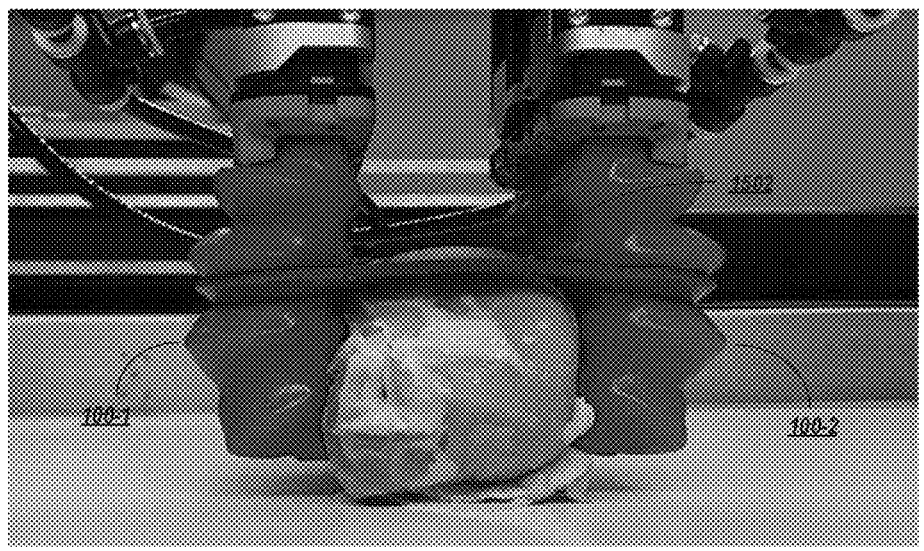

FIG. 15G depicts the four-actuator system grasping a target object (in this example, a slippery and irregularly-shaped target object such as a piece of chicken). FIG. 15H depicts the membrane 1502 in a close-up view, whereas FIG. 15I shows the system approaching the target object and FIG. 15J depicts the system making initial contact with, and beginning to grasp, the target object.

Grippers with Extension Tips

Figure 16:
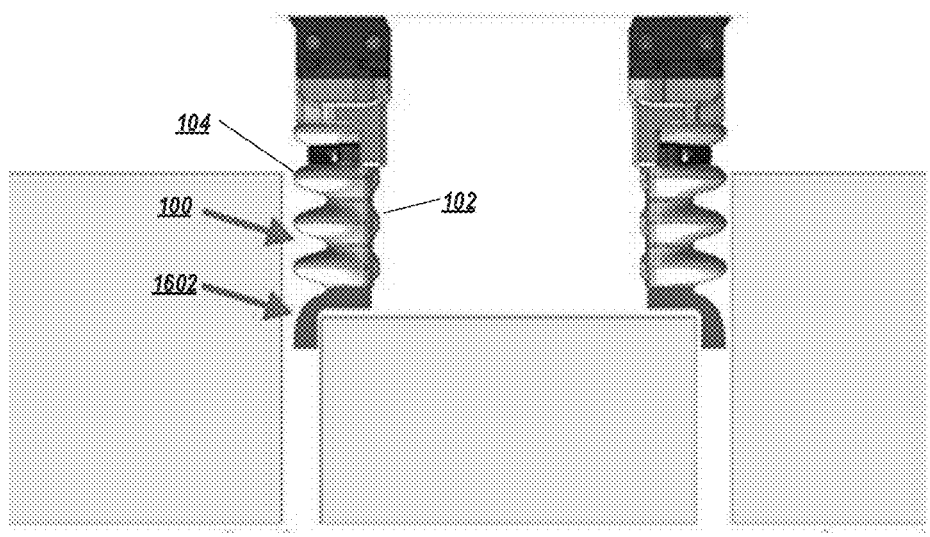
FIG. 16 depicts a gripper including exemplary actuators having gripping finger tips.

FIG. 16 depicts actuators 100 designed with grasping surfaces in the form of gripper tips 1602 located along the exterior part of the actuator. The gripper tips 1602 allow the gripper to maneuver in tightly packed environments to pick an object without colliding with neighboring objects.

In some cases, the width of the robotic arm and/or gripper may not necessarily be the limiting factor in grasping a target object in a cluttered or constrained environment. For example, the actuators 100 themselves, having gripping surfaces on an inwardly-oriented surface, may have too large a cross-section for some applications. Accordingly, the extent to which the cross-section of the actuators 100 extend outside of the cross-section of the object to be gripped may be reduced or minimized using the tips 1602.

The tips 1602 may be elastomeric, completely rigid (e.g. made out of plastic) or rigid with a compliant surface (e.g. having a gripper tip that is elastomeric with an overmolded hard plastic part at its core). The tips 1602 may be textured on an interior gripping surface in order to increase friction and/or grip in the area of the tips 1602 configured to grasp a target object.

The gripper tips 1602 may extend from the distal end of the actuators 100 and may provide a gripping surface interior (i.e., in the direction of the outer tips of the accordion extensions 104) to the base 102 of the actuator.

By positioning the gripper tips 1602 towards the outer surface of the actuator, the amount of actuator cross section that is located outside of the cross-sectional area needed for grasping may be minimized. Accordingly, the gripper and/or actuators may be maneuvered into tight spaces or between closely-packed objects, as in the example shown in FIG. 16.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A soft robotic system comprising:
an arm distal end;
a gripper comprising two or more soft robotic actuators, wherein each soft robotic actuator is inflatable with an inflation fluid and operative to exert a force in a radial direction along an inner circumferential edge of the actuator;
an extension rod comprising a gripper end affixed to the gripper and a second end affixed to the arm distal end, the extension rod having a width that is less than a width of the arm distal end;
a non-manual pneumatic, mechanical, or hydraulic adjustment device configured to adjust a distance between the gripper and the arm distal end by extending or retracting the extension rod; and
a controller programmed with logic stored on a non-transitory computer readable medium, the logic comprising instructions for:
approaching a container with gripper oriented at a first angle with respect to a bottom of the container, the container comprising one or more walls;
at least partially disposing the gripper within the walls of the container;
after the gripper is at least partially disposed within the walls of the container, reorienting the gripper to a second angle less steep as compared to the first angle; and
grasping a target object within the container with the gripper oriented at the second angle.

2. The system of claim 1, wherein the arm distal end comprises an opening for receiving the extension rod and the adjustment device.

3. The soft robotic system of claim 1, wherein the extension rod is a telescopic rod.

4. The soft robotic system of claim 1, wherein each soft robotic actuator exerts the force when inflated with the inflation fluid.

5. The system of claim 1, wherein the extension rod is configured to adjust a distance between the gripper and the arm distal end to a predetermined distance.

6. The system of claim 1, wherein the extension rod is configured to adjust a distance between the gripper and the arm distal end to a variable distance.

7. The system of claim 1, wherein the system comprises a plurality of extension rods.

8. The system of claim 1, wherein the first angle is substantially 90 degrees.

9. The system of claim 1, wherein, given a geometry of the robotic system and the container, the gripper would collide with the one or more walls of the container if initially deployed at the second angle.

10. The system of claim 1, wherein the instructions further comprise instructions for extending the extension rod before reorienting the gripper to the second angle.

11. The system of claim 1, wherein the instructions further comprise instructions for extending the extension rod while reorienting the gripper to the second angle.

12. The system of claim 1, wherein the instructions further comprise instructions for extending the extension rod after reorienting the gripper to the second angle.

13. The system of claim 1, wherein the instructions are configured to cause the robotic system to grasp the target object for a particular side.

14. The system of claim 1, wherein the instructions are configured to cause the robotic system to grasp the target object at a particular angle.

15. The system of claim 1, wherein the instructions are configured to cause the robotic system to avoid collision with a neighboring object disposed proximal to the target object.

16. The system of claim 1, wherein the instructions are configured to cause the robotic system to grasp the target object at one or more target grasping points.

* * * * *